US008055764B2

(12) United States Patent
Kataoka et al.

(10) Patent No.: US 8,055,764 B2
(45) Date of Patent: Nov. 8, 2011

(54) COMPUTER SYSTEM AND MANAGEMENT COMPUTER FOR IDENTIFYING SEAT POSITION

(75) Inventors: Mikio Kataoka, Kokubunji (JP); Hiroshi Kodaka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1007 days.

(21) Appl. No.: 11/896,365

(22) Filed: Aug. 31, 2007

(65) Prior Publication Data

US 2008/0134301 A1    Jun. 5, 2008

(30) Foreign Application Priority Data

Dec. 5, 2006   (JP) .................................. 2006-327983

(51) Int. Cl.
*G06F 15/16*   (2006.01)
(52) U.S. Cl. ....................................................... 709/224
(58) Field of Classification Search .................. 709/223, 709/224
See application file for complete search history.

(56) References Cited

U.S. PATENT DOCUMENTS

| | | | | |
|---|---|---|---|---|
| 2001/0042201 A1* | 11/2001 | Yamaguchi et al. | .......... | 713/151 |
| 2002/0013855 A1* | 1/2002 | Ishii et al. | .......... | 709/237 |
| 2007/0177161 A1* | 8/2007 | Ishii et al. | .......... | 356/614 |
| 2007/0288566 A1* | 12/2007 | Murakami et al. | .......... | 709/204 |

FOREIGN PATENT DOCUMENTS

| | | | |
|---|---|---|---|
| JP | 08-195769 | | 1/1995 |
| JP | 2002-259648 | | 9/2002 |
| JP | 2002259648 A | * | 9/2002 |
| JP | 2005-323172 | | 11/2005 |
| JP | 2005323172 A | * | 11/2005 |

OTHER PUBLICATIONS

Office Action issued by the Japanese Patent Office on May 10, 2011 in the corresponding Japanese Patent Application No. 2006-327983 (2 pages).

* cited by examiner

*Primary Examiner* — Wing Chan
*Assistant Examiner* — Andrew Woo
(74) *Attorney, Agent, or Firm* — Stites & Harbison PLLC; Juan Carlos A. Marquez, Esq.

(57) ABSTRACT

Provided is a computer system capable of identifying a seat position of a user even in a network to which an individually-assigned device and a device used by a plurality of users are connected coexistently. The computer system for identifying a seat position of a user, includes: a device used by the user; a network device to which the device is connected, for coupling the device to a network; and a management computer coupled to the network. In the computer system, the management computer judges which of an individually-assigned device and a shared-use device the device connected to the network device is, obtains a unique identifier of the user and information indicating a connection relationship between the network device and the device connected to the network device from the network device, and identifies the seat position of the user based on the unique identifier of the user and the information indicating the connection relationship.

11 Claims, 12 Drawing Sheets

COMPUTER SYSTEM AND MANAGEMENT COMPUTER FOR IDENTIFYING SEAT POSITION

CLAIM OF PRIORITY

The present application claims priority from Japanese patent application P2006-327983 filed on Dec. 5, 2006, the content of which is hereby incorporated by reference into this application.

BACKGROUND OF THE INVENTION

This invention relates to a computer system for identifying a seat position of a user who uses a device, and more particularly, to a computer system for identifying a seat position of a user of a device used by a plurality of users.

In recent years, ongoing measures for reducing office costs include introduction of a "free-address office" in which a plurality of employees share seats in an office instead of being assigned with fixed seats. This allows remarkable reduction of spaces within the office particularly in a section with those who are often away on business, which leads to the reduction of the office costs. Other expected effects of the free-address office include prevention of accumulation of unnecessary documents because there is no fixed seat provided in the office.

However, when there is no fixed seat provided in the office, it is impossible to identify a seat position of the employee. This creates the need for confirming whether or not the employee is seated somewhere in the office and identifying where a given employee is seated in a case where a face-to-face conversation with the given employee is intended. To meet the need, there are proposed systems for identifying the seat position of an employee and displaying the seat position.

To be specific, as disclosed in JP 08-195769 A, there is known a technique in which such a database that a correspondence relationship between a MAC address of a device connected to a network line concentrator and a user ID of a user who uses the device is previously registered is used to identify a position of the user by identifying the user ID of the user who uses the device based on the MAC address of the device when the device is connected to a network.

However, the conventional technique has a problem in that a device and users do not correspond to each other on a one-to-one basis in a case where a single device is shared by a plurality of users through user authentication or the like. Thus, it is impossible to create such a database that a one-to-one correspondence relationship between the MAC address of the single device and the user IDs of the plurality of users who use the device is previously registered. Accordingly, the seat position of the user cannot be identified in a computer system including a device used by a plurality of users.

In addition, management costs increase in the case where the correspondence relationship between the MAC address of the device and the user ID of the user of the device is previously registered in the database.

SUMMARY OF THE INVENTION

According to a representative embodiment of this invention, there is provided a computer system for identifying a seat position of a user, including: a computer used by the user; a network connection device to which the computer is connected, for coupling the computer to a network; and a management computer, for identifying the seat of the user, which is connected to the network, the computer system storing a database in which a correspondence relationship between a unique identifier of the computer and a unique identifier of the user who uses the computer is registered, in which the management computer is configured to: judge, in a case of reception of information indicating that the computer has been connected to the network connection device, by referring the database, which of an individually-assigned computer that is individually assigned to the user and a shared-use computer used by a plurality of users the computer connected to the network device is; obtain, if the computer connected to the network device is judged to be the shared-use computer, the unique identifier of the user of the computer connected to the network device; obtain, from the network device, information indicating a connection relationship between the network connection device and the computer connected to the network connection device; and identify the seat position of the user based on the obtained unique identifier of the user and the obtained information indicating the connection relationship.

According to the embodiment of this invention, it is possible to identify the seat position of a user even in a network to which an individually-assigned device and a device used by a plurality of users are connected coexistently.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

Description will be made of a first embodiment of this invention with reference to FIGS. 1 to 8.

Figure 1:
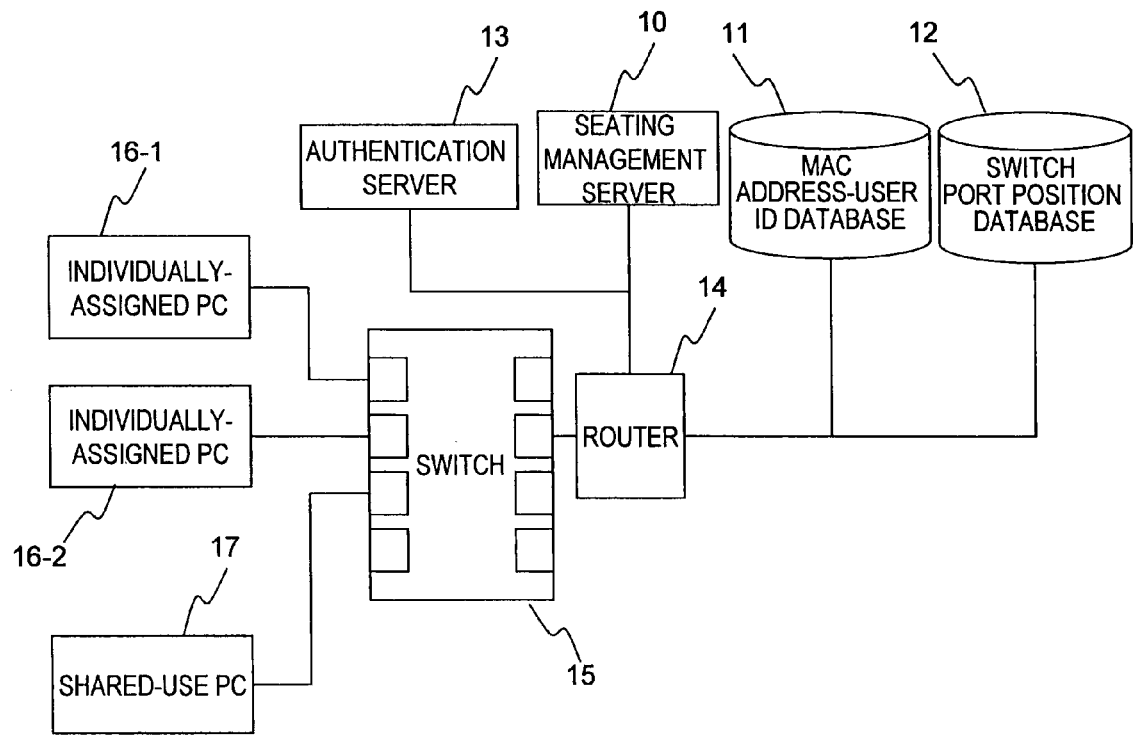
FIG. 1 is a diagram for explaining a structure of a seat position identification system according to a first embodiment of this invention.

FIG. 1 is a diagram for explaining a structure of a seat position identification system according to the first embodiment of this invention.

The seat position identification system includes a seating management server 10, a MAC address-user ID database 11, a switch port position database 12, an authentication server 13, a router 14, a switch 15, individually-assigned computers (PCs) 16-1 and 16-2 (hereinafter, each being denoted also by reference numeral 16), and a shared-use computer (PC) 17.

The seating management server 10 is a computer including a processor, a storage unit, and an interface, for managing information on a user of the individually-assigned PC 16 or shared-use PC 17 that is currently connected to a network.

The MAC address-user ID database 11 stores a correspondence relationship between a MAC address of the individually-assigned PC 16 connected to the network and a user ID of a user of the individually-assigned PC 16. The user ID is a unique identifier of the user of the individually-assigned PC 16.

The switch port position database 12 stores position identification information indicating which position within an office a port provided to the switch 15 located in the seat position identification system exists at.

An example of the position identification information includes an identifier of a desk involving a connection to the port provided to the switch 15. The position identification information may be an identifier of an area defined by segmenting the office in specific bounds. Further, the position identification information may be coordinates of a place where the switch 15 is located within the office represented in a coordinate system.

It should be noted that the MAC address-user ID database 11 and the switch port position database 12 may be stored in the storage unit provided to the seating management server 10.

The authentication server 13 is a computer including a processor, a storage unit, and an interface, for authenticating whether or not the user who is to use the shared-use PC 17 is a legal user thereof.

The router 14 is a device connected to the switch 15.

The switch 15 is a device to which the individually-assigned PCs 16 and the shared-use PC 17 are connected. Information on the switch 15 is obtained by another device via a simple network management protocol (SNMP). The switch 15 is set to transmit an SNMP linkup trap to the seating management server 10 when each of the individually-assigned PCs 16 and shared-use PC 17 that are used by the respective users is connected to the switch 15.

The individually-assigned PCs 16 are computers each including a processor, a storage unit, and an interface, which are assigned to the respective users. The MAC address-user ID database 11 stores information indicating the correspondence relationship between the MAC address of the individually-assigned PC 16 and the user ID of the user who uses the individually-assigned PC 16.

The shared-use PC 17 is a computer including a processor, a storage unit, and an interface, which is used by a plurality of users. After the authentication server 13 authenticates that the user who is to use the shared-use PC 17 is a legal user, the shared-use PC 17 transmits to the seating management server 10 the user ID of the user who uses the shared-use PC 17, an IP address of the shared-use PC 17, and the MAC address of the shared-use PC 17.

It should be noted that FIG. 1 shows an example of using the two individually-assigned PCs 16 composed of the individually-assigned PC 16-1 and the individually-assigned PC 16-2, but the number of individually-assigned PCs 16 is not limited. Similarly, FIG. 1 shows an example of using the one shared-use PC 17, but the number of shared-use PCs 17 is not limited.

Figure 2:
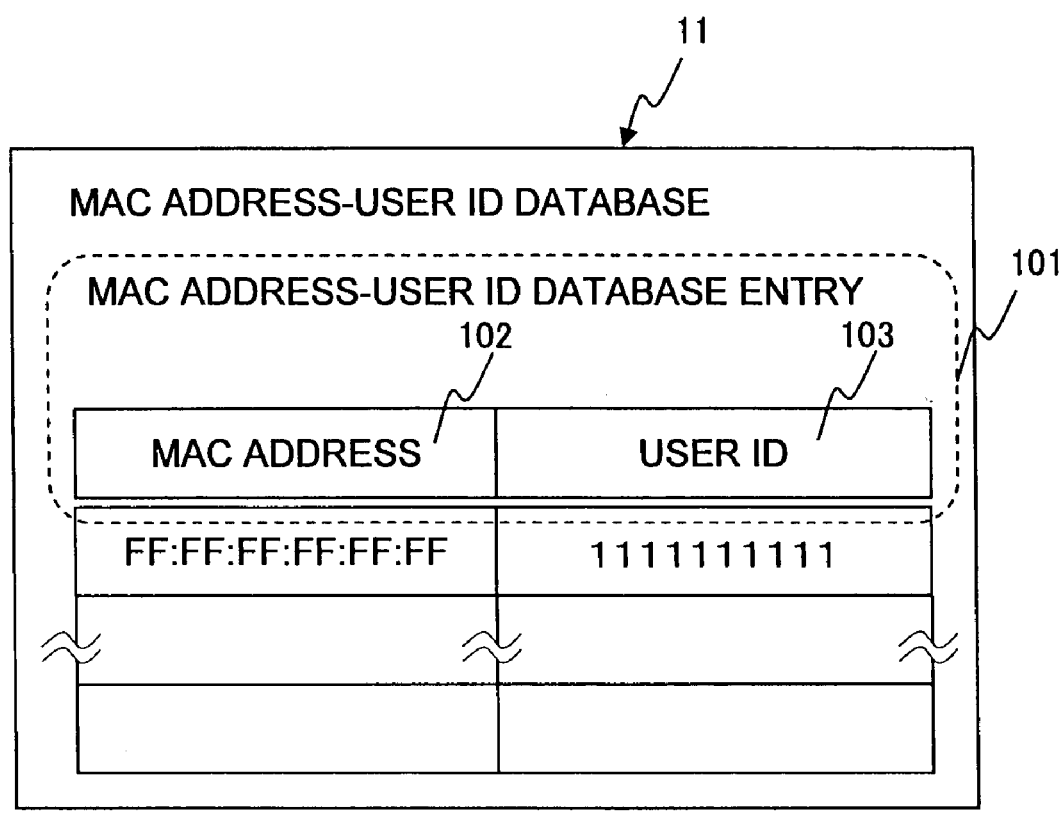
FIG. 2 is a diagram for explaining contents of a MAC address-user ID database according to the first embodiment of this invention.

FIG. 2 is a diagram for explaining contents of the MAC address-user ID database 11 according to the first embodiment of this invention.

The MAC address-user ID database 11 is composed of a set of MAC address-user ID database entries 101. The MAC address-user ID database entry 101 is composed of a plurality of fields in each of which actual data is stored. To be specific, the MAC address-user ID database entry 101 is composed of a MAC address field 102 and a user ID field 103.

Stored in the MAC address field 102 are the MAC addresses of the individually-assigned PC 16 and shared-use PC 17 that are connected to the network. Stored in the user ID field 103 are the user IDs of the respective users who use the individually-assigned PC 16 and shared-use PC 17 that are identified by the MAC addresses stored in the MAC address field 102. To be specific, the user ID is an ID of the user, which is represented in a lightweight directory access protocol (LDAP).

Figure 3:
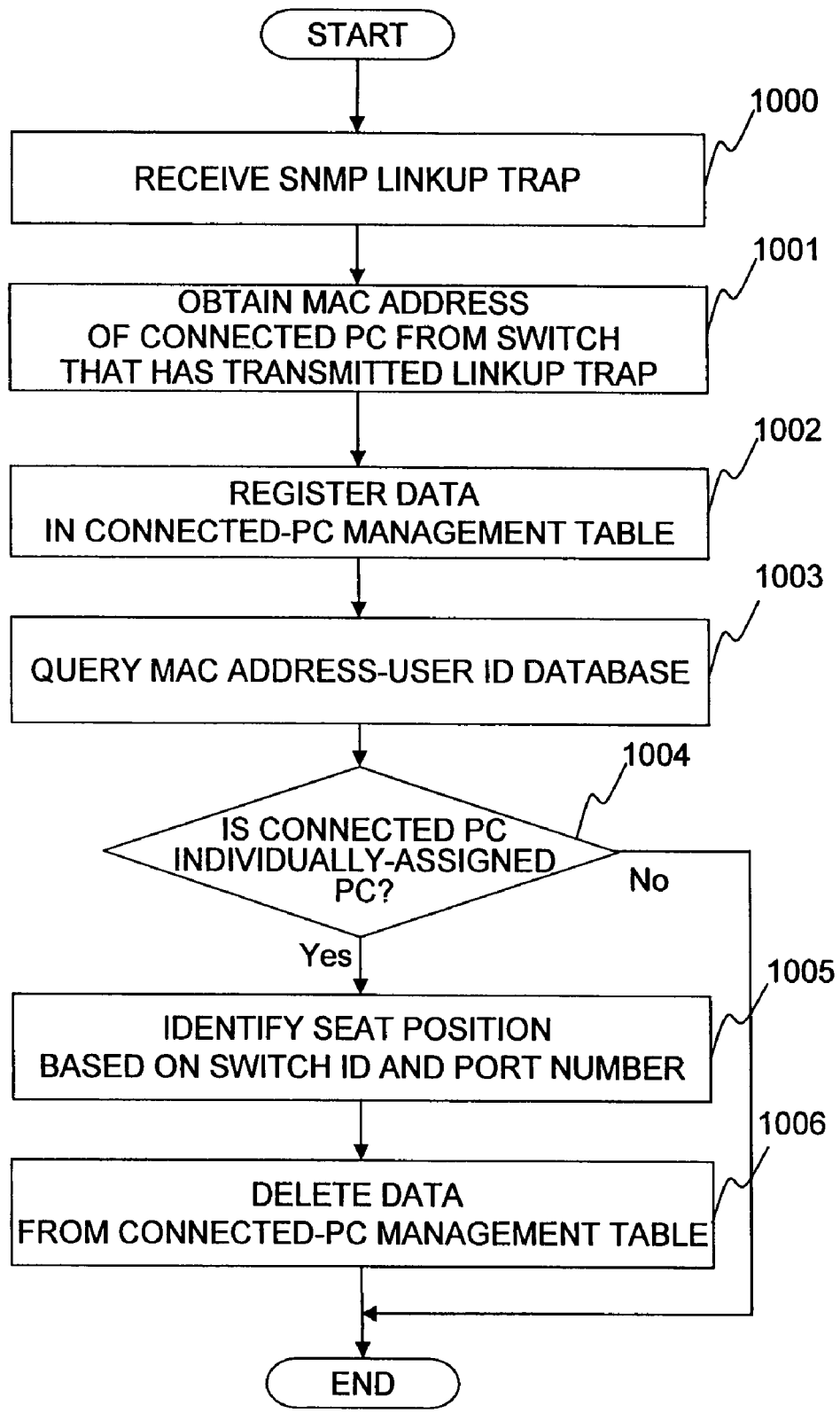
FIG. 3 is a flowchart of processing of identifying a seat position of a user of an individually-assigned PC according to the first embodiment of this invention.

FIG. 3 is a flowchart of processing of identifying a seat position of the user of the individually-assigned PC 16 according to the first embodiment of this invention.

The seating management server 10 receives an SNMP linkup trap transmitted by the switch 15 (1000). The SNMP linkup trap contains an IP address of the switch 15 of a transmission source and a port number of a port to which the individually-assigned PC 16 or the shared-use PC 17 is connected among ports provided to the switch 15 of the transmission source.

Upon reception of the SNMP linkup trap, the seating management server 10 identifies the switch 15 of the transmission source by the IP address of the switch 15 contained in the received SNMP linkup trap. The seating management server 10 obtains from the identified switch 15 a MAC address of the individually-assigned PC 16 or shared-use PC 17 connected to the port identified by the port number contained in the SNMP linkup trap (1001).

The seating management server 10 registers in a connected-PC management table stored in the seating management server 10 an entry including: the IP address of the switch 15 of the transmission source; the port number of the port to which the individually-assigned PC 16 or the shared-use PC 17 is connected; the MAC address of the individually-assigned PC 16 or shared-use PC 17 connected to the switch 15 of the transmission source; and a time of receiving the SNMP linkup trap (1002). The connected-PC management table will be described later in detail with reference to FIG. 5.

Then, the seating management server 10 references the MAC address-user ID database 11 to retrieve a user ID stored in the user ID field 103 of the MAC address-user ID database entry 101 that has a MAC address in the MAC address field 102 matching the MAC address obtained in Step 1001 (1003).

Subsequently, the seating management server 10 judges whether or not a PC connected to the switch 15 that has transmitted the SNMP linkup trap is the individually-assigned PC 16 (1004). To be specific, if the user ID corresponding to the MAC address is retrieved in Step 1003, the seating management server 10 judges that the PC connected to the switch 15 is the individually-assigned PC 16.

On the other hand, if the user ID corresponding to the MAC address is not retrieved in Step 1003, the seating management server 10 judges that the PC connected to the switch 15 is not the individually-assigned PC 16. In other words, if the user ID corresponding to the MAC address is not retrieved in Step 1003, the seating management server 10 judges that the PC connected to the switch 15 is the shared-use PC 17.

In this case, the seating management server 10 ends the processing of identifying the seat position of the user of the individually-assigned PC 16. Upon reception of the user ID of the shared-use PC 17 connected to the switch 15, the MAC address of the shared-use PC 17, and the IP address of the shared-use PC 17, the seating management server 10 starts processing of identifying a seat position of the user of the shared-use PC 17 shown in FIG. 4. The processing of identifying the seat position of the user of the shared-use PC 17 will be described later in detail with reference to FIG. 4.

On the other hand, if it judged in Step 1004 that the PC connected to the switch 15 that has transmitted the SNMP linkup trap is the individually-assigned PC 16, the seating management server 10 references the switch port position database 12 to obtain position information on the port of the switch 15 to which the individually-assigned PC 16 is connected based on the IP address of the switch 15 and the port number of the port to which the individually-assigned PC 16 is connected which are contained in the SNMP linkup trap received in Step 1000 (1005).

Based on a combination of the user ID retrieved in Step 1003 and the position information on the port obtained in Step 1005, the seating management server 10 identifies the seat position of the user identified by the user ID retrieved in Step 1003. Accordingly, the seat position of the user of the individually-assigned PC 16 connected to the switch 15 is identified.

Then, the seating management server 10 deletes the entry registered in Step 1002 from the connected-PC management table (1006), and ends the processing.

Figure 4:
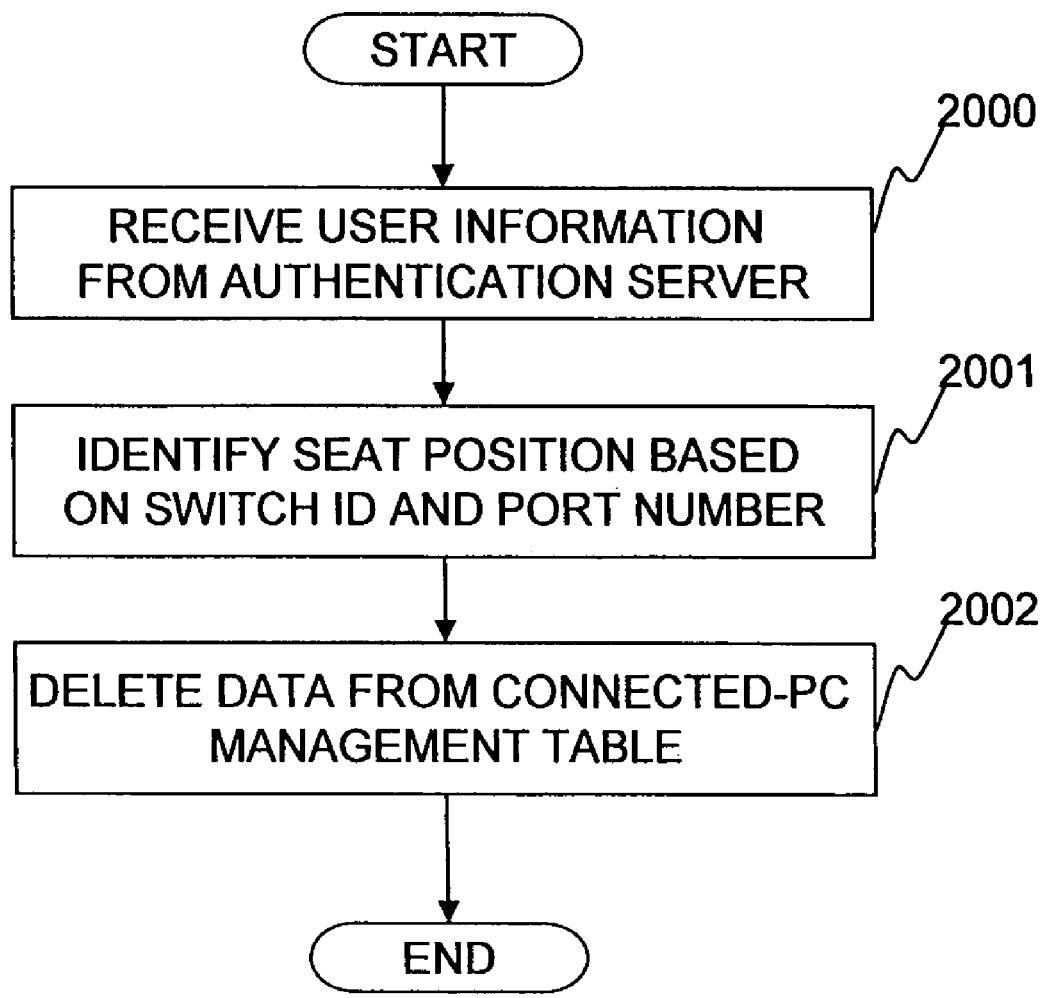
FIG. 4 is a flowchart of processing of identifying a seat position of a user of a shared-use PC according to the first embodiment of this invention.

FIG. 4 is a flowchart of the processing of identifying the seat position of the user of the shared-use PC 17 according to the first embodiment of this invention.

The seating management server 10 receives from the authentication server 13 user information including a user ID of the shared-use PC 17 connected to the switch 15, a MAC address of the shared-use PC 17, and an IP address of the shared-use PC 17 (2000). The user information may be transmitted by the shared-use PC 17 instead of being transmitted by the authentication server 13.

Subsequently, the seating management server 10 obtains the IP address of the switch 15 to which the shared-use PC 17 identified by the MAC address included in the received user information is connected and the port number of the port to which the shared-use PC 17 identified by the MAC address included in the received user information is connected.

To be specific, the seating management server 10 uses the SNMP to obtain the IP address and port number of the switch 15. Alternatively, the seating management server 10 may reference the connected-PC management table to obtain an IP address of the switch 15 stored in the switch ID field 202 of an entry, which has a MAC address in the MAC address field 204 matching the MAC address received in Step 2000, among entries of the connected-PC management table, and a port number stored in the switch port number field 203 of the same entry.

Then, the seating management server 10 references the switch port position database 12 to obtain the position information on the port of the switch 15 to which the shared-use PC 17 is connected based on the obtained IP address and port number of the switch 15 (2001).

Based on a combination of the user ID included in the user information received in Step 2001 and the position information on the port obtained in Step 2001, the seating management server 10 identifies the seat position of the user identified by the user ID included in the user information received in Step 2001. Accordingly, the seat position of the user of the shared-use PC 17 connected to the switch 15 is identified.

Then, the seating management server 10 deletes the entry registered in Step 1002 from the connected-PC management table (2002), and ends the processing.

Figure 5:
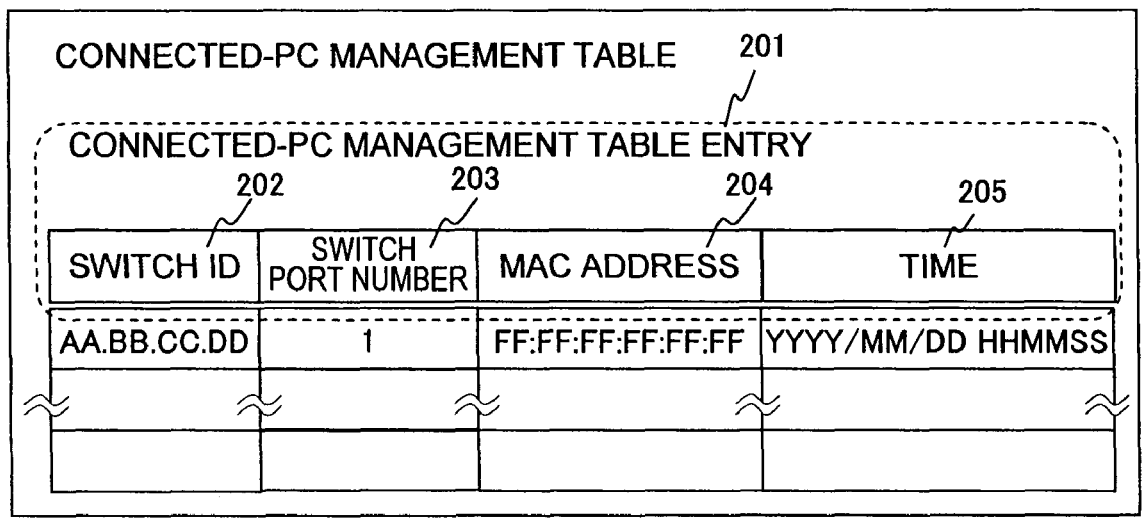
FIG. 5 is a diagram showing a structure of a connected-PC management table according to the first embodiment of this invention.

FIG. 5 is a diagram showing a structure of the connected-PC management table according to the first embodiment of this invention.

In the connected-PC management table, the IP address and the like of the switch 15 that has transmitted the SNMP linkup trap are registered in Step 1002.

To be specific, the connected-PC management table is composed of a set of connected-PC management table entries 201. The connected-PC management table entry 201 is composed of a plurality of fields in each of which actual data is stored. To be specific, the connected-PC management table entry 201 is composed of the switch ID field 202, the switch port number field 203, the MAC address field 204, and a time field 205.

Stored in the switch ID field 202 is a unique identifier of the switch 15 connected to the network. In this embodiment, the IP address of the switch 15 is stored in the switch ID field 202. Stored in the switch port number field 203 is the port number of the port to which the individually-assigned PC 16 or the shared-use PC 17 is connected among the ports provided to the switch 15.

Stored in the MAC address field 204 is the MAC address of the individually-assigned PC 16 or shared-use PC 17 connected to the port that is identified by the port number stored in the switch port number field 203. Stored in the time field 205 is the time at which the seating management server 10 receives the SNMP linkup trap.

Figure 6:
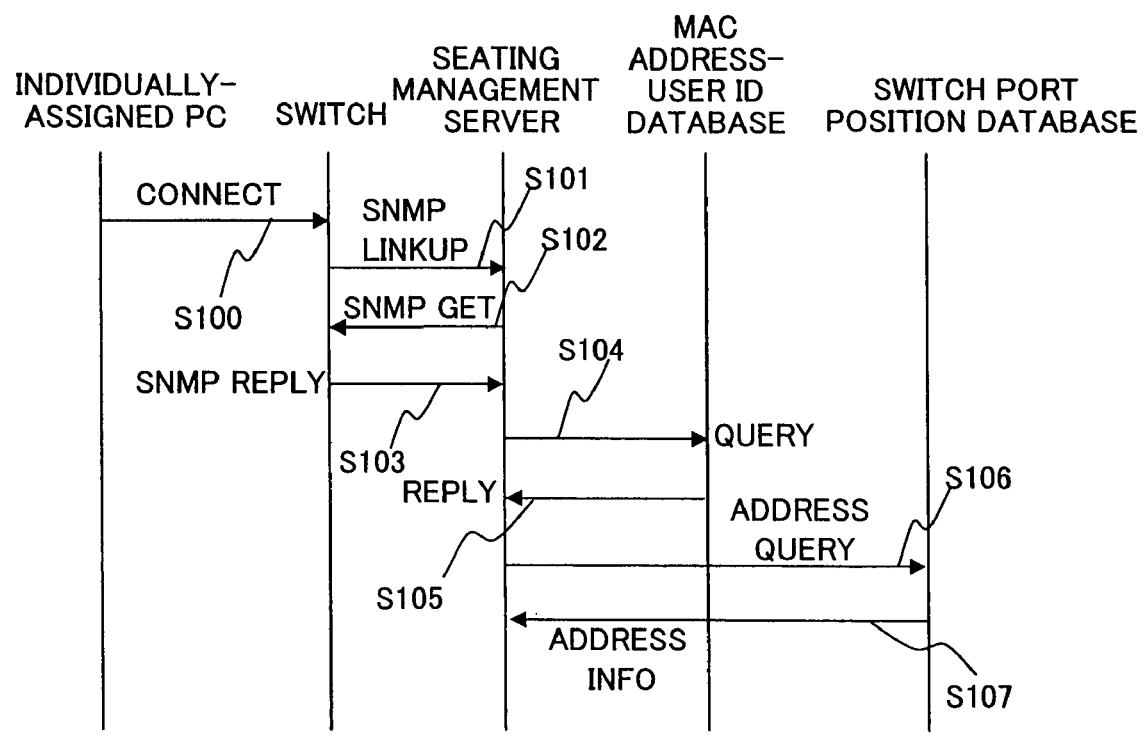
FIG. 6 is a sequence diagram of the processing of identifying the seat position of the user of the individually-assigned PC according to the first embodiment of this invention.

FIG. 6 is a sequence diagram of the processing of identifying the seat position of the user of the individually-assigned PC 16 according to the first embodiment of this invention.

When the individually-assigned PC 16 is connected to the switch 15 (S100), the switch 15 uses an SNMP linkup trap to transmit to the seating management server 10 the IP address of the switch 15 and the port number of the port to which the individually-assigned PC 16 is connected (S101).

Upon reception of the IP address of the switch 15 and the port number of the port to which the individually-assigned PC 16 is connected, the seating management server 10 uses the SNMP to transmit to the switch 15 a GET request to obtain the MAC address of the individually-assigned PC 16 connected to the port that is identified by the received port number (S102).

Upon reception of the GET request for the MAC address transmitted in Step S102, the switch 15 obtains the MAC address of the individually-assigned PC 16 that has been connected to the port in Step S100, and transmits the MAC address to the seating management server 10 (S103).

Subsequently, the seating management server 10 references the MAC address-user ID database 11 to retrieve the user ID corresponding to the received MAC address (S104 and S105). In this case, the PC connected to the switch 15 is the individually-assigned PC 16, and the user ID of the user of the individually-assigned PC 16 is registered in the MAC address-user ID database 11. Thus, the seating management server 10 obtains the user ID corresponding to the received MAC address. Based on the obtained user ID, the seating management server 10 can further obtain other information on the user identified by the user ID.

Further, the seating management server 10 obtains position information on the port of the switch 15 to which the individually-assigned PC 16 is connected based on the IP address of the switch 15 and the port number of the port to which the individually-assigned PC 16 is connected which are contained in the SNMP linkup trap (S106 and S107).

Based on a combination of the user ID obtained in Steps S104 and S105 and the position information on the port obtained in Steps S106 and S107, the seating management server 10 can identify the seat position of the user of the individually-assigned PC 16.

Figure 7:
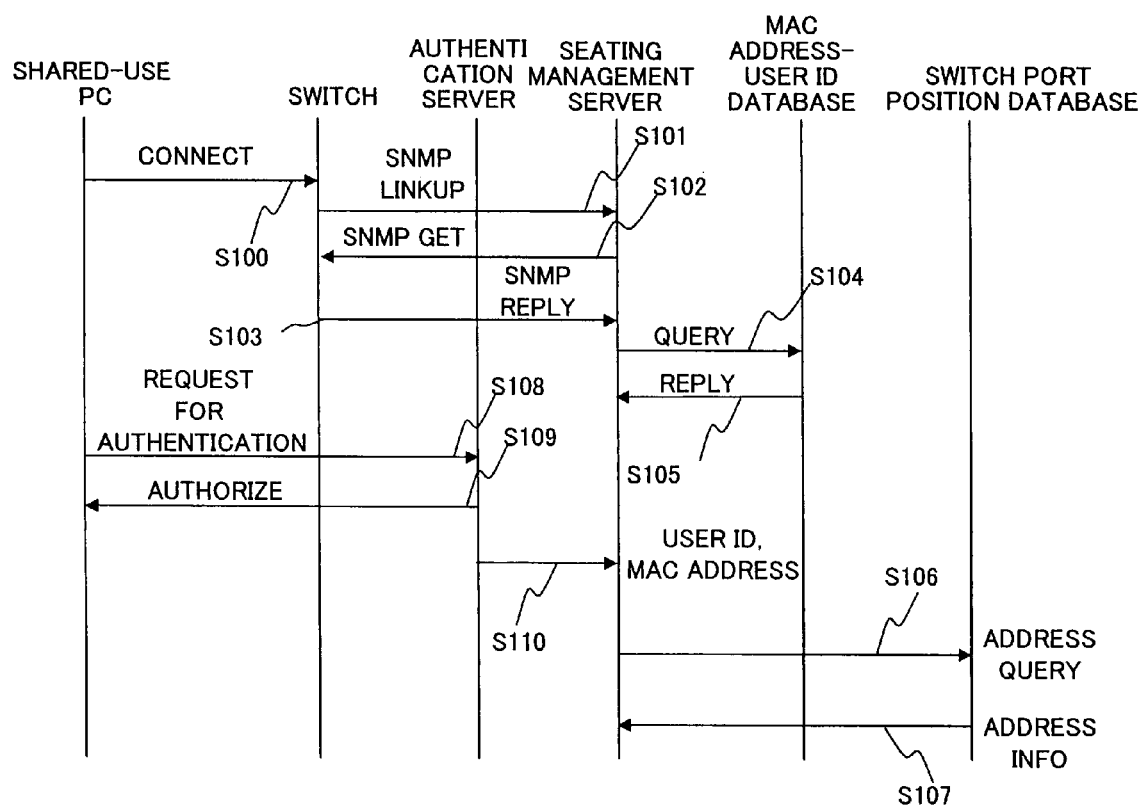
FIG. 7 is a sequence diagram of the processing of identifying the seat position of the user of the shared-use PC according to the first embodiment of this invention.

FIG. 7 is a sequence diagram of the processing of identifying the seat position of the user of the shared-use PC 17 according to the first embodiment of this invention.

It should be noted that Steps S100 to S105 shown in FIG. 7 are different from Steps S100 to S105 shown in FIG. 6 in that the PC connected to the switch 15 is the shared-use PC 17. However, steps S100 to S105 shown in FIG. 7 are otherwise the same as Steps S100 to S105 shown in FIG. 6, so description thereof will be omitted.

The PC connected to the switch 15 is the shared-use PC 17, and the user ID of the user of the shared-use PC 17 is not registered in the MAC address-user ID database 11. Thus, the seating management server 10 cannot obtain the user ID corresponding to the received MAC address in Steps S104 and S105.

In this case, the seating management server 10 suspends the processing until the seating management server 10 receives from the authentication server 13 the user information including the user ID of the shared-use PC 17 connected to the switch 15, the MAC address of the shared-use PC 17, and the IP address of the shared-use PC 17.

Meanwhile, the shared-use PC 17 transmits an authentication request to the authentication server 13 (S108). The authentication request contains the user ID of the user of the shared-use PC 17, information required for authentication, and the MAC address of the shared-use PC 17. Upon reception of the authentication request, in a case where the user ID and information required for authentication that are contained in the authentication request match a legal user ID and legal information required for authentication stored in the authentication server 13, the authentication server 13 transmits to the shared-use PC 17 information indicating that the user has been authorized to use the shared-use PC 17 (S109). Examples of the information required for authentication include a password.

It should be noted that Steps S108 and S109 are not necessarily executed after Step S105 in FIG. 7, and may be executed at any timing after execution of Step S100 and before execution of Step S110.

After authorizing the user to use the shared-use PC 17, the authentication server 13 transmits to the seating management server 10 the user ID received in Step S108 and the MAC address of the shared-use PC 17 received in S108 (S110).

It should be noted that the authentication server 13 transmits the user ID of the shared-use PC 17 and the MAC address of the shared-use PC 17 to the seating management server 10 in this case, but the user ID of the shared-use PC 17 and the MAC address of the shared-use PC 17 may be transmitted by the shared-use PC 17 itself to the seating management server 10.

Upon reception of the user ID of the shared-use PC 17 and the MAC address of the shared-use PC 17, the seating management server 10 obtains the IP address of the switch 15 to which the shared-use PC 17 identified by the received MAC address of the shared-use PC 17 is connected and the port number of the port to which the shared-use PC 17 identified by the MAC address included in the received user information is connected.

It should be noted that the seating management server 10 may use the SNMP to obtain the IP address and port number of the switch 15, or may reference the connected-PC management table to obtain the same.

Then, the seating management server 10 obtains the position information on the port of the switch 15 to which the shared-use PC 17 is connected based on the obtained IP address of the switch 15 and the obtained port number of the port to which the shared-use PC 17 is connected (S106 and S107).

Based on a combination of the user ID obtained in Step S110 and the position information on the port obtained in Steps S106 and S107, the seating management server 10 can identify the seat position of the user of the shared-use PC 17.

In this embodiment, the seating management server 10 waits for the reception of the user information in the case where the PC connected to the switch 15 is the shared-use PC 17. If the user information cannot be received in a predetermined time period, the seating management server 10 may cause at least one of a display of the shared-use PC 17 connected to the switch 15 and a display of the seating management server 10 to display an alert. The predetermined time period is set as a time period that is normally required for the authentication server 13 to authenticate the shared-use PC 17.

Accordingly, it is possible to detect whether or not a PC connected to the network is an illegal PC, which improves the network security.

Next, description will be made of a first modified example of the first embodiment of this invention.

In the first modified example of the first embodiment of this invention, the MAC address of the individually-assigned PC 16 and the MAC address of the shared-use PC 17 are registered in the MAC address-user ID database 11 in advance. Accordingly, the seating management server 10 can positively judge whether or not the PC connected to the switch 15 is the shared-use PC 17 with reference to the MAC address-user ID database 11.

To be specific, if the MAC address-user ID database 11 includes no MAC address that matches the MAC address of the PC connected to the switch 15, the seating management server 10 can detect that the PC is an illegal PC.

Figure 8:
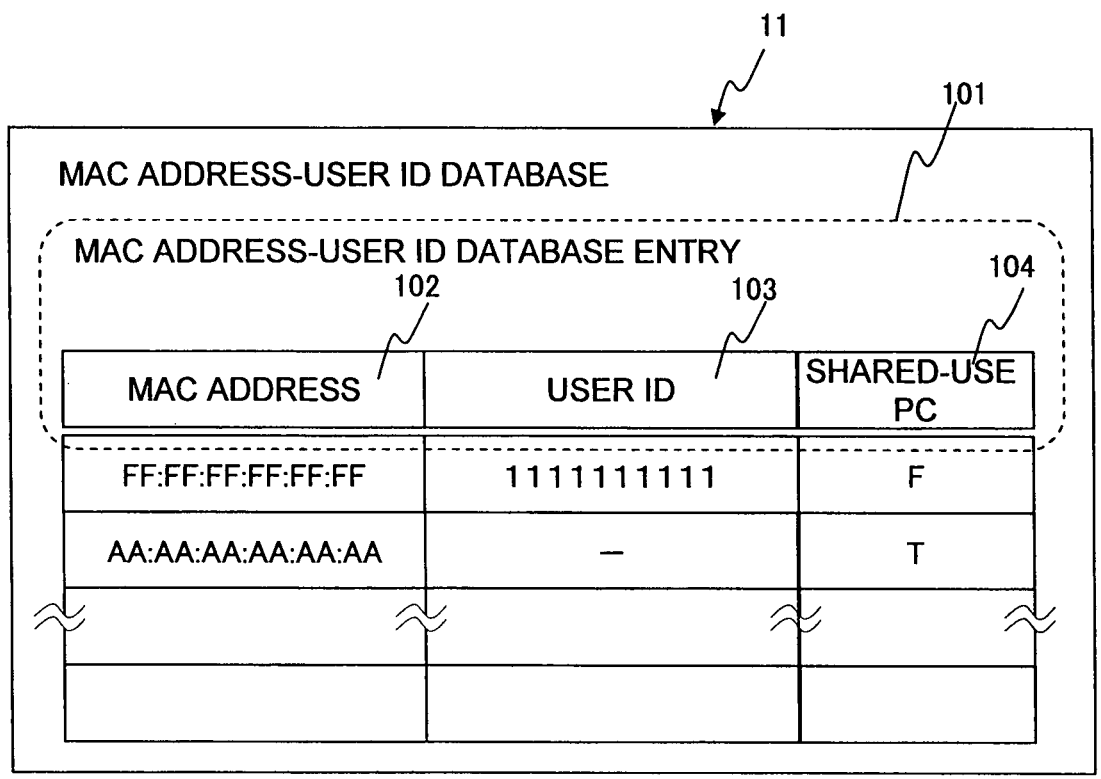
FIG. 8 is a diagram for explaining contents of a MAC address-user ID database according to a first modified example of the first embodiment of this invention.

FIG. 8 is a diagram for explaining contents of the MAC address-user ID database 11 according to the first modified example of the first embodiment of this invention. It should be noted that structural components of the MAC address-user ID database 11 according to the first modified example of the first embodiment which are the same as those of the MAC address-user ID database 11 according to the first embodiment are denoted by the same reference numerals, and description thereof will be omitted.

The MAC address-user ID database entry 101 is composed of the MAC address field 102, the user ID field 103, and a shared-use PC field 104.

Stored in the shared-use PC field 104 is information indicating whether or not a PC corresponding to the entry is the shared-use PC 17. To be specific, true ("T") or false ("F") is stored in the shared-use PC field 104. "T" stored in the shared-use PC field 104 indicates that the PC identified by the MAC address stored in the MAC address field 102 of the same entry is the shared-use PC 17. "F" stored in the shared-use PC field 104 indicates that the PC identified by the MAC address stored in the MAC address field 102 of the same entry is not the shared-use PC 17.

It should be noted that if "T" is stored in the shared-use PC field 104, the user of the shared-use PC 17 cannot be identified, so no data is registered in the user ID field 103 included in the same entry.

The seating management server 10 references the MAC address-user ID database shown in FIG. 8 in Step 1004 when judging whether or not the PC connected to the switch 15 that has transmitted the SNMP linkup trap is the individually-assigned PC 16.

If "F" is found to be stored in the shared-use PC field 104 corresponding to the MAC address in Step 1003, the seating management server 10 judges that the PC connected to the switch 15 is the individually-assigned PC 16. If "T" is found to be stored in the shared-use PC field 104 corresponding to the MAC address in Step 1003, the seating management server 10 judges that the PC connected to the switch 15 is the shared-use PC 17.

Next, description will be made of a second modified example of the first embodiment of this invention.

The authentication server 13 uses a session initiation protocol (SIP) uniform resource identifier (URI) as the user ID to authenticate whether or not the shared-use PC 17 is a legal PC.

In this case, in the user ID field 103 included in the MAC address-user ID database 11, the SIP URI is stored as the user ID.

Accordingly, the seating management server 10 can identify a position within an office of an IP telephone set that is performing communication by using the SIP URI. In addition, if the IP telephone set is one dedicated to a user, the seating management server 10 can identify the position of the user within the office.

If a computer system including the seating management server 10 is provided with a database for storing a correspondence relationship between a user ID (SIP URI) of an IP telephone set and a user ID (LDAP) of a PC, the seating management server 10 can use the existing user information database to obtain other information on the user of the IP telephone set.

In the first embodiment of this invention, the MAC address is used as the unique identifier of the PC, but the IP address or the like may also be used.

According to the first embodiment of this invention, even in a computer system in which the individually-assigned PC 16 and the shared-use PC 17 coexist, the seating management server 10 can identify the position of the user.

Second Embodiment

Description will be made of a second embodiment of this invention with reference to FIGS. 9 to 12.

In the second embodiment of this invention, the position of a user is identified without using the MAC address-user ID database 11 according to the first embodiment of this invention. It should be noted that the same structural components as those of the first embodiment are denoted by the same reference numerals, and description thereof will be omitted.

Figure 9:
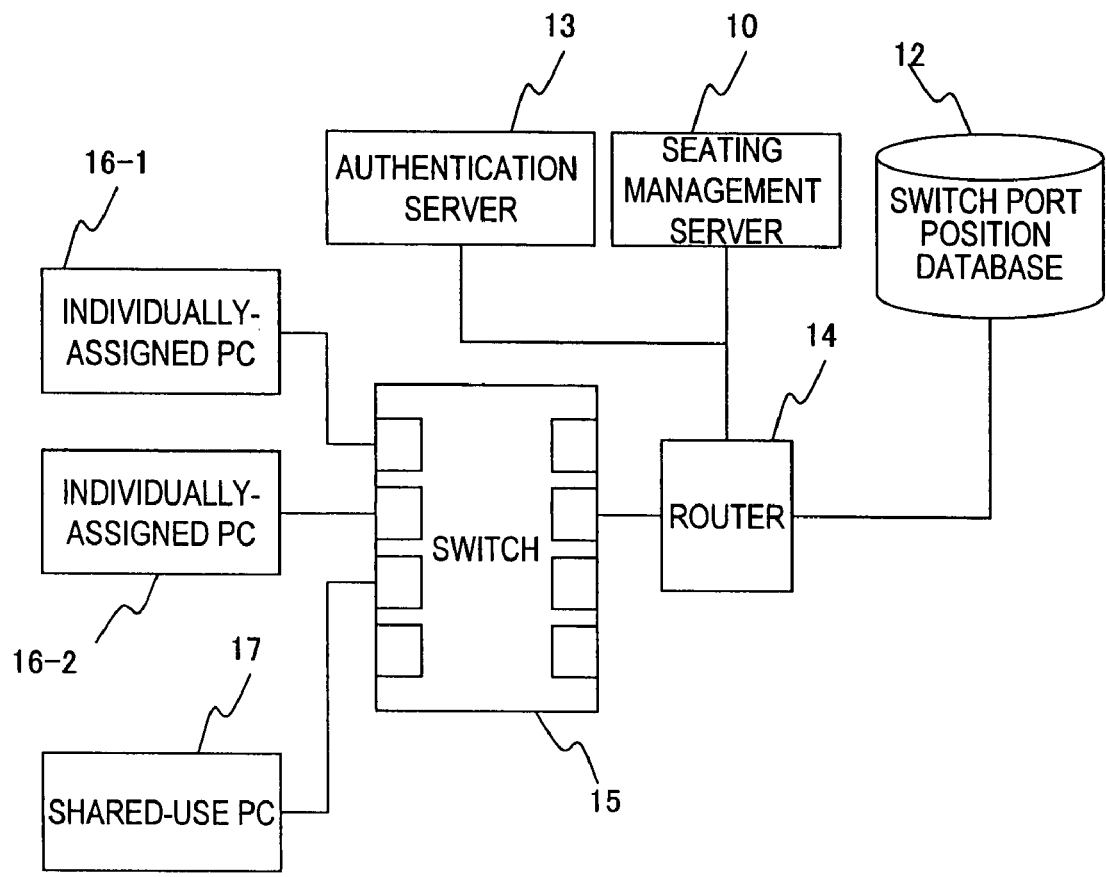
FIG. 9 is a diagram for showing a structure of a seat position identification system according to a second embodiment of this invention.

FIG. 9 is a diagram for showing a structure of a seat position identification system according to the second embodiment of this invention.

The seat position identification system includes the seating management server 10, the switch port position database 12, the authentication server 13, the router 14, the switch 15, the individually-assigned PC 16, and the shared-use PC 17. In the second embodiment of this invention, the MAC address-user ID database does not exist in the seat position identification system.

In the first embodiment, the authentication server 13 does not authenticate whether or not the user of the individually-assigned PC 16 is a legal user, while in this embodiment, the authentication server 13 authenticates whether or not each of the user of the individually-assigned PC 16 and the user of the shared-use PC 17 is a legal user.

Further, in the first embodiment, the switch 15 transmits the SNMP linkup trap to the seating management server 10 when the individually-assigned PC 16 or the shared-use PC 17 is connected to the switch 15, while in this embodiment, the switch 15 does not transmit an SNMP linkup trap to the seating management server 10 even when the individually-assigned PC 16 or the shared-use PC 17 is connected to the switch 15.

Figure 10:
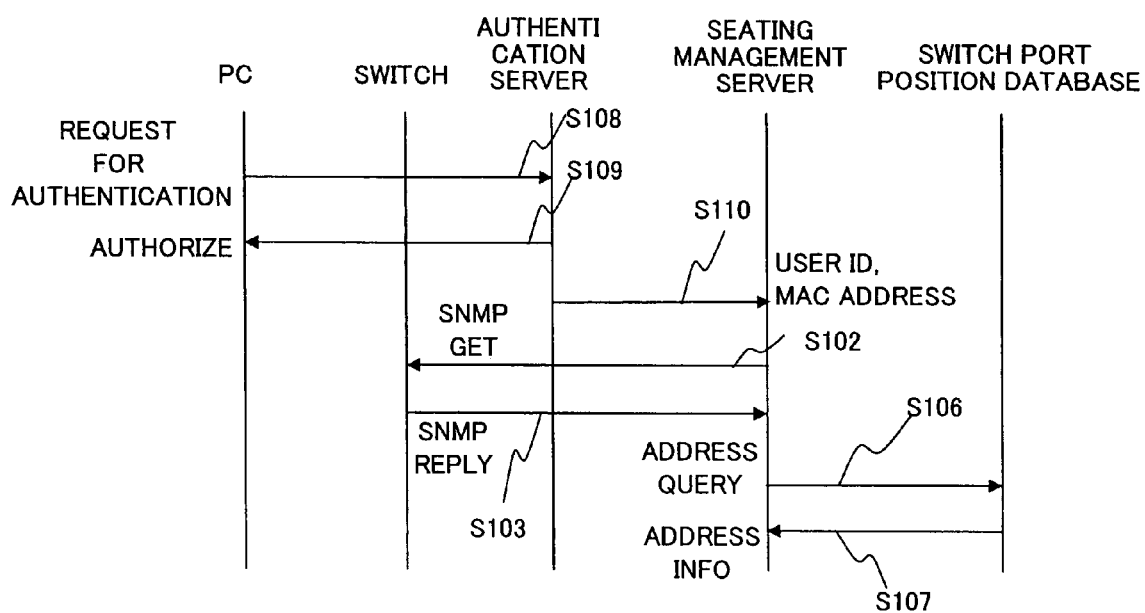
FIG. 10 is a sequence diagram of processing of identifying a seat position of a user of a PC according to the second embodiment of this invention.

FIG. 10 is a sequence diagram of processing of identifying a seat position of a user of a PC according to the second embodiment of this invention.

First, the individually-assigned PC 16 or shared-use PC 17 (hereinafter, referred to simply as "PC") transmits an authentication request to the authentication server 13 (S108). The authentication request contains the user ID of the user of the PC, information required for authentication, and the MAC address of the PC. Upon reception of the authentication request, in a case where the user ID and information required for authentication that are contained in the authentication request match a legal user ID and legal information required for authentication stored in the authentication server 13, the authentication server 13 transmits, to the PC, information indicating that the user has been authorized to use the PC (S109). Examples of the information required for authentication include a password.

The authentication server 13 transmits the received user ID and the received MAC address to the seating management server 10 (S110).

Upon reception of the user ID of the user of the PC and the MAC address of the PC, the seating management server 10 uses the SNMP to transmit to the switch 15 a GET request to obtain the IP address of the switch 15 to which the PC identified by the received MAC address is connected and the port number of the port to which the PC is connected (S102).

Upon reception of the GET request for the IP address and port number of the switch 15 which has been transmitted in Step S102, the switch 15 to which the PC that has transmitted the authentication request to the authentication server 13 is connected transmits to the seating management server 10 the IP address of the switch 15 and the port number of the port to which the PC is connected (S103).

Then, upon reception of the IP address of the switch 15 and the port number of the switch 15, the seating management server 10 references the switch port position database 12 to obtain the position information on the port of the switch 15 to which the PC is connected based on the received IP address of the switch 15 and the received port number of the switch 15 (S106 and S107).

Based on the combination of the user ID obtained in Step S110 and the position information on the port obtained in Steps S106 and S107, the seating management server 10 can identify the seat position of the user of the PC.

It should be noted that the authentication server 13 transmits the user ID of the PC and the MAC address of the PC to the seating management server 10 in Step S110, but the user ID of the PC and the MAC address of the PC may be transmitted by the PC itself to the seating management server 10.

Next, description will be made of a first modified example of the second embodiment of this invention with reference to FIGS. 11 and 12.

In the first modified example of the second embodiment of this invention, upon reception of the user ID of the PC and the MAC address of the PC, the seating management server 10 stores the received user ID of the PC and the received MAC address of the PC in the MAC address-user ID database 11.

It should be noted that the seat position identification system according to this modified example has the same structure as that shown in FIG. 1.

Figure 11:
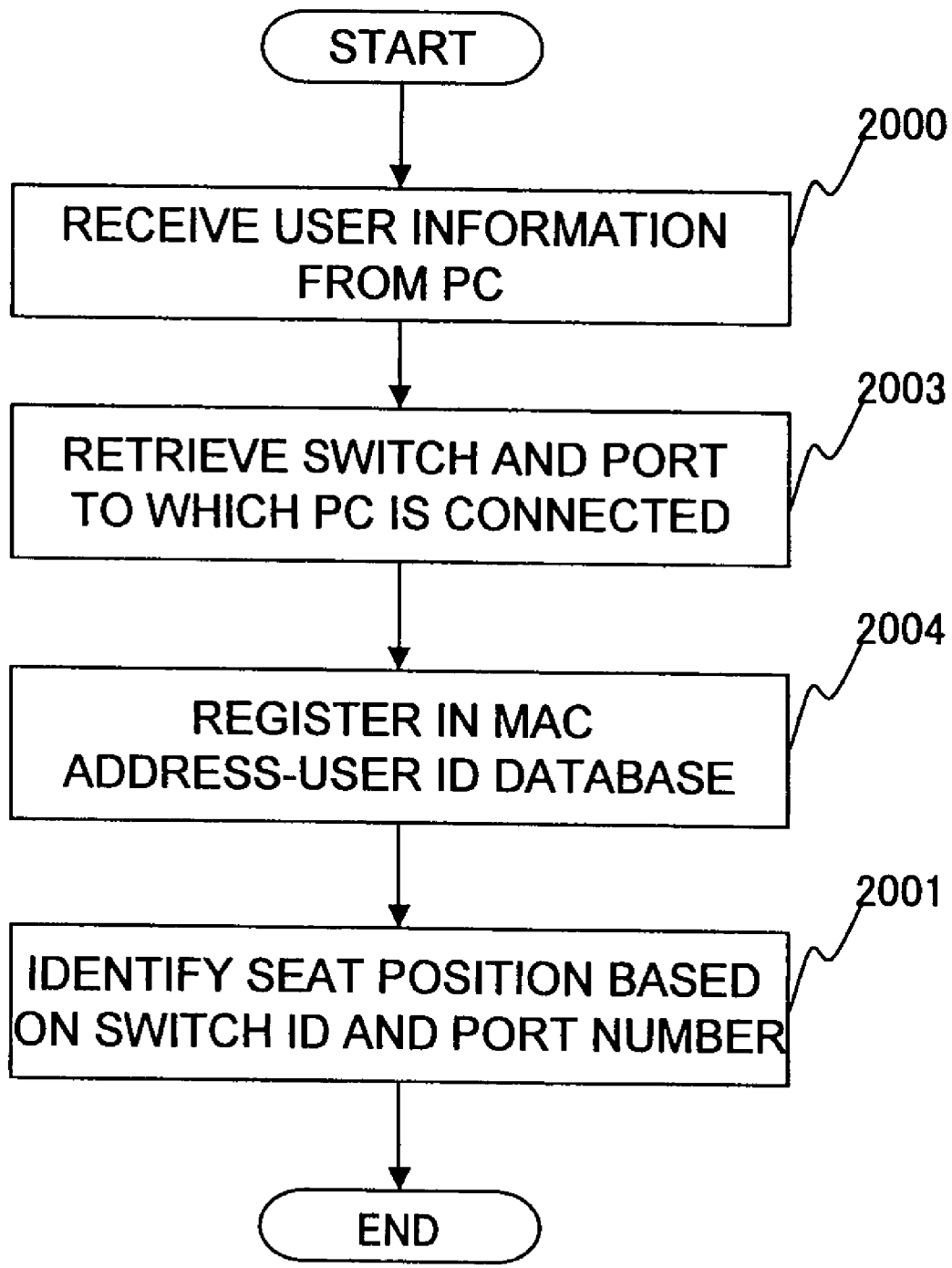
FIG. 11 is a flowchart of processing of identifying a seat position of a user of a PC according to a first modified example of the second embodiment of this invention.

FIG. 11 is a flowchart of processing of identifying a seat position of a user of a PC according to the first modified example of the second embodiment of this invention. It should be noted that in the processing of FIG. 11, the same steps as in the processing of FIG. 4 are denoted by the same reference numerals, and description thereof will be omitted.

Upon reception of the user information from the PC (2000), the seating management server 10 uses the SNMP to obtain the IP address of the switch 15 to which the PC is connected and the port number of the port to which the PC is connected (2003).

Then, the seating management server 10 registers the MAC address of the PC and user ID that are obtained in Step 2000 in the MAC address-user ID database 11 (2004).

Subsequently, the seating management server 101 references the switch port position database 12 to identify the position information on the port of the switch 15 to which the PC is connected based on the IP address of the switch 15 and the port number that are obtained in Step 2003 (2001).

Based on the combination of the user ID included in the user information received in Step 2000 and the position information on the port obtained in Step 2001, the seating management server 10 identifies the seat position of the user identified by the user ID included in the user information received in Step 2001. Accordingly, the seat position of the user of the PC connected to the switch 15 is identified.

Figure 12:
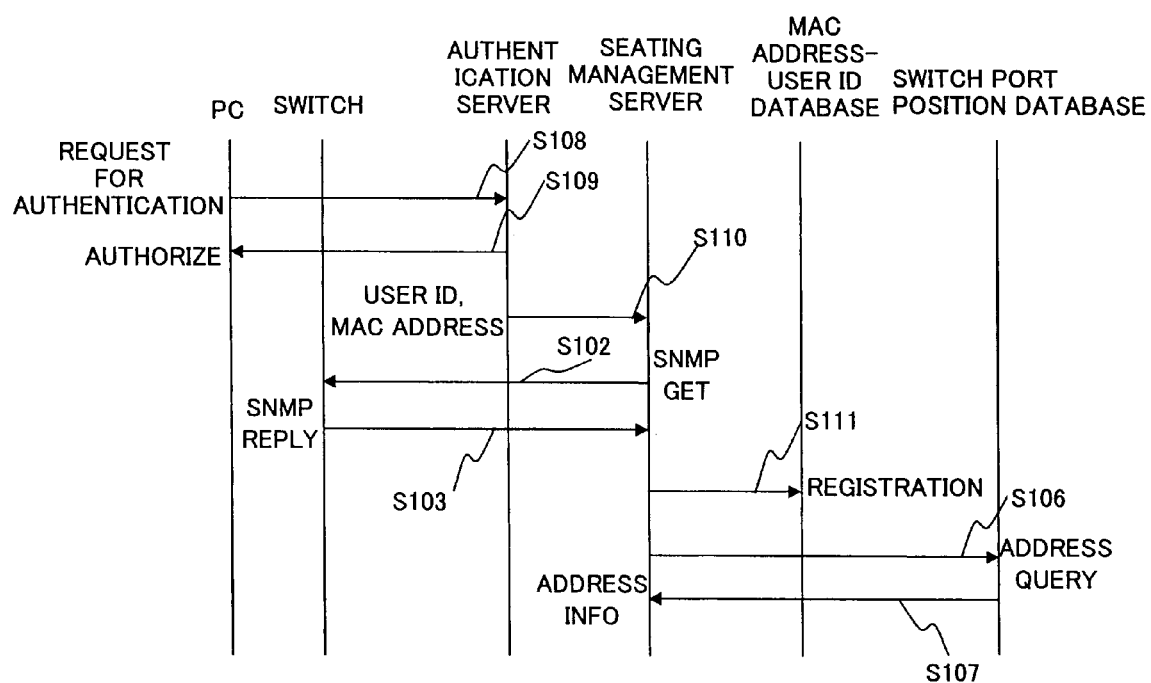
FIG. 12 is a sequence diagram of the processing of identifying the seat position of the user of the PC according to the first modified example of the second embodiment of this invention.

FIG. 12 is a sequence diagram of the processing of identifying the seat position of the user of the PC according to the first modified example of the second embodiment of this invention.

After obtaining the IP address of the switch 15 to which the PC that has transmitted the authentication request to the authentication server 13 is connected and the port number of the port to which the PC that has transmitted the authentication request to the authentication server 13 is connected in Steps S102 and S103, the seating management server 10 registers the MAC address of the PC that has transmitted the authentication request and the user ID in the MAC address-user ID database 11 (S111).

The other steps are the same as those of FIG. 10, so description thereof will be omitted.

Accordingly, when all of PCs existing in the network are the individually-assigned PCs 16, the MAC address-user ID database 11 is automatically created, so the MAC address-user ID database 11 does not need to be created in advance. Consequently, it is possible to reduce the cost of network management.

Next, description will be made of a second modified example of the second embodiment of this invention.

The authentication server 13 uses an SIP URI as the user ID to authenticate whether or not the shared-use PC 17 is a legal PC.

In this case, in the user ID field 103 included in the MAC address-user ID database 11, the SIP URI is stored as the user ID.

Accordingly, the seating management server 10 can identify the position within an office of an IP telephone set that is performing communication using the SIP URI. In addition, if the IP telephone set is one dedicated to a user, the seating management server 10 can identify the position of the user within the office.

If a computer system including the seating management server 10 is provided with the database for storing the correspondence relationship between the user ID (SIP URI) of an IP telephone set and the user ID (LDAP) of a PC, the seating management server 10 can use the existing user information database to obtain other information on the user of the IP telephone set.

In the second embodiment of this invention, the MAC address is used as the unique identifier of the PC, but the IP address or the like may also be used.

According to the second embodiment of this invention, the MAC address-user ID database 11 storing the correspondence relationship between the MAC address of a PC and the user ID of the PC is automatically created, so the MAC address-user ID database 11 does not need to be created in advance. Consequently, it is possible to reduce the cost of network management.

Even in a system in which a device connected to the network is not managed, it is possible to automatically associate a user with the device used by the user, which allows management of the device connected to the network.

While the present invention has been described in detail and pictorially in the accompanying drawings, the present invention is not limited to such detail but covers various obvious modifications and equivalent arrangements, which fall within the purview of the appended claims.

What is claimed is:

1. A computer system for identifying a seat position of a user, comprising:

a computer used by the user;

a network device to which the computer is connected, for coupling the computer to a network; and a management computer, for identifying the seat position of the user, which is coupled to the network, the computer system storing a database in which a correspondence relationship between a unique identifier of the computer and a unique identifier of the user who uses the computer is registered, wherein the management computer is configured to:

judge, in a case of reception of information indicating that the computer has been connected to the network device, by referring the database, whether the computer connected to the network device is an individually-assigned computer that is individually assigned to the user or a shared-use computer used by a plurality of users;

obtain, in case of which the computer connected to the network device is judged to be the shared-use computer, the unique identifier of the user of the computer connected to the network device;

obtain, from the network device, information indicating a connection relationship between the network device and the computer connected to the network device; and identify the seat position of the user based on the obtained unique identifier of the user and the obtained information indicating the connection relationship, wherein the management computer is configured to:

identify, in a case of which the computer connected to the network device is ludged to be the individually-assigned computer, by referring the database, the unique identifier of the user corresponding to the unique identifier of the computer connected to the network device, obtain the information indicating the connection relationship between the network device and the computer connected to the network device from the network device, and identify the seat position of the user based on the identified unique identifier of the user and the obtained information indicating the connection relationship.

2. The computer system according to claim 1, wherein the unique identifier of the user includes an SIP URI.

3. The computer system according to claim 1, wherein the unique identifier of the computer includes a MAC Address of the computer.

4. The computer system according to claim 1, wherein the unique identifier of the computer includes an IP Address of the computer.

5. The computer system according to claim 1, wherein:
the network device comprises a port to which the computer is connected; and
the information indicating the connection relationship includes a unique identifier of the network device and a unique identifier of the port to which the computer is connected.

6. A computer system for identifying a seat position of a user, comprising:
a first computer used by the user;
a network device to which the first computer is connected, for coupling the first computer to a network;
a management computer, for identifying the seat position of the user, which is coupled to the network,
a first database that stores a first correspondence relationship between identification information of the first computer and identification information of the user who uses the first computer;
a second database that stores a second correspondence relationship between identification information of a port of the network device and identification information of a seat corresponding to the port; and
an authentication computer, for authenticating the user of the first computer, which is coupled to the network, wherein:
the first computer is configured to transmit to the authentication computer the identification information of the user of the first computer and the identification information of the first computer,
the authentication computer is configured to transmit to the management computer the received identification information of the user of the first computer and the received identification information of the first computer, and
the management computer is configured to obtain the identification information of the user of the first computer and the identification information of the first computer by receiving from the authentication computer the identification information of the user of the first computer and the identification information of the first computer, and wherein:
the management computer is configured to:
obtain, upon reception of information indicating that the first computer has been connected to the network device, the identification information of the first computer connected to the network device from the information indicating that the first computer has been connected to the network device,
determine, by referring the first database, whether the first computer identified by the obtained identification information of the first computer is an individually-assigned computer that is individually assigned to the user or a shared-use computer for use by a plurality of users, obtain, upon determining that the first computer connected to the network device is a shared-use computer, the identification information of the user of the first computer connected to the network device, obtain the identification information of the of the port of the network device connected to the first computer, obtain, by referring the second database, the identification information of the seat corresponding to the obtained identification information of the port, and identify the seat position of the user based on the obtained identification information of the user and the obtained identification information of the seat.

7. The computer system according to claim 6, wherein the identification information of the user of the first computer includes an SIP URI.

8. The computer system according to claim 6, wherein the identification information of the first computer includes a MAC Address of the first computer.

9. The computer system according to claim 6, wherein the identification information of the first computer includes an IP Address of the first computer.

10. A management computer for identifying a seat position of a user in a computer system, the computer system comprising:
a computer used by the user;
a network device to which the computer is connected, for coupling the computer to a network; and
the management computer coupled to the network, the management computer comprising:
a processor for performing operations;
a storage unit connected to the processor; and
an interface connected to the processor, wherein:
the computer system stores a database in which a correspondence relationship between a unique identifier of the computer and a unique identifier of the user who uses the computer is registered; and
the processor is configured to:
judge, in a case of reception of information indicating that the computer has been connected to the network device, by referring the database, whether the computer connected to the network device is an individually-assigned computer that is individually assigned to the user or a shared-use computer used by a plurality of users;
obtain, in a case of which the computer connected to the network device is judged to be the shared-use computer, the unique identifier of the user of the computer connected to the network device;
obtain, from the network device, information indicating a connection relationship between the network device and the computer connected to the network device; and
identify the seat position of the user based on the obtained unique identifier of the user and the obtained information indicating the connection relationship, and wherein
the processor is configured to:
identify, in a case of the computer connected to the network device is judged to be the individually-assigned computer, by referencing the database, the unique identifier of the user corresponding to the unique identifier of the computer connected to the network device,
obtain the information indicating the connection relationship between the network device and the computer connected to the network device from the network device, and
identify the seat position of the user based on the identified unique identifier of the user and the obtained information indicating the connection relationship.

11. A management computer for identifying a seat position of a user in a computer system, the computer system comprising:
- a first computer used by the user;
- a network device to which the first computer is connected, for coupling the first computer to a network;
- the management computer, for identifying the seat position of the user, which is coupled to the network,
- a first database that stores a first correspondence relationship between identification information of the first computer and identification information of the user who uses the first computer; and
- a second database that stores a second correspondence relationship between identification information of a port of the network device and identification information of a seat corresponding to the port,
- the management computer comprising:
- a processor for performing operations;
- a storage unit connected to the processor;
- an interface connected to the processor; and
- an authentication computer, for authenticating the user of the first computer, which is coupled to the network, wherein:
- the first computer is configured to transmit to the authentication computer the identification information of the user of the first computer and the identification information of the first computer,
- the authentication computer is configured to transmit to the management computer the received identification information of the user of the first computer and the received identification information of the first computer,
- the management computer is configured to obtain the identification information of the user of the first computer and the identification information of the first computer by receiving from the authentication computer the identification information of the user of the first computer and the identification information of the first computer, and
- wherein the processor is configured to:
- obtain, upon reception of information indicating that the first computer has been connected to the network device, the identification information of the first computer connected to the network device from the information indicating that the first computer has been connected to the network device,
- determine, by referring the first database, whether the first computer identified by the obtained identification information of the first computer is an individually-assigned computer that is individually assigned to the user or a shared-use computer for use by a plurality of users,
- obtain, upon determining that the first computer connected to the network device is a shared-use computer, the identification information of the user of the first computer connected to the network device;
- obtain the identification information of the of the port of the network device connected to the first computer;
- obtain, by referring the second database, the identification information of the seat corresponding to the obtained identification information of the port; and
- identify the seat position of the user based on the obtained identification information of the user and the obtained identification information of the seat.

* * * * *